United States Patent
Shih et al.

(10) Patent No.: US 6,780,924 B2
(45) Date of Patent: Aug. 24, 2004

(54) COMPOSITIONS FOR PRINTABLE MEDIA

(75) Inventors: Frank Yen-Jer Shih, Arcadia, CA (US); Walter J. Kras, Santa Ana, CA (US); Zhisong Huang, San Dimas, CA (US)

(73) Assignee: Avery Dennison Corporation, Pasadena, CA (US)

( * ) Notice: Subject to any disclaimer, the term of this patent is extended or adjusted under 35 U.S.C. 154(b) by 45 days.

(21) Appl. No.: 10/017,759

(22) Filed: Dec. 14, 2001

(65) Prior Publication Data

US 2003/0050379 A1 Mar. 13, 2003

Related U.S. Application Data

(60) Provisional application No. 60/256,016, filed on Dec. 15, 2000.

(51) Int. Cl.$^7$ ............................................. C08F 216/04
(52) U.S. Cl. ................ 524/555; 524/548; 524/502; 526/323.2; 526/302; 526/317.1; 526/329.1; 526/329.7
(58) Field of Search ............................. 526/323.2, 302, 526/317.1, 329.1, 329.7; 524/502, 548, 555

(56) References Cited

U.S. PATENT DOCUMENTS

| | | | |
|---|---|---|---|
| 3,912,446 A | 10/1975 | Zviak et al. | |
| 4,629,663 A | * 12/1986 | Brown et al. | 428/343 |
| 5,064,888 A | 11/1991 | Farwaha et al. | |
| 5,208,285 A | 5/1993 | Boyce et al. | |
| 5,623,011 A | * 4/1997 | Bernard | 524/270 |
| 5,744,540 A | * 4/1998 | Baumstark et al. | 524/558 |
| 5,908,723 A | 6/1999 | Malhotra et al. | |
| 6,037,390 A | 3/2000 | Page et al. | |
| 6,039,444 A | 3/2000 | Mori et al. | |

FOREIGN PATENT DOCUMENTS

| | | | |
|---|---|---|---|
| EP | 0501433 A1 | 9/1992 | |
| WO | WO 99/04981 | 2/1999 | |
| WO | WO 9904981 A1 * | 2/1999 | ............ B41M/5/00 |

* cited by examiner

Primary Examiner—David W. Wu
Assistant Examiner—Satya B Sastri
(74) Attorney, Agent, or Firm—Christie, Parker & Hale, LLP

(57) ABSTRACT

Improved binders, ink-receptive compositions, and coated substrates are provided. The ink-receptive compositions contain a binder, a particulate filler, and a mordant. A preferred binder comprises one or more acrylic copolymers made with at least one wet abrasion resistance-enhancing monomer. Papers, films, labels and similar products, coated with an ink-receptive composition, are also provided.

8 Claims, 1 Drawing Sheet

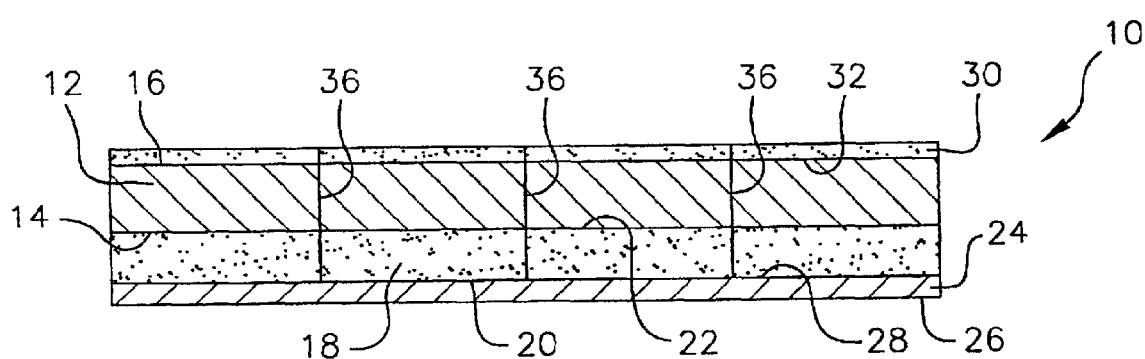

COMPOSITIONS FOR PRINTABLE MEDIA

CROSS REFERENCE

This application claims the benefit of Provisional Patent Application No. 60/256,016; filed Dec. 15, 2000.

FIELD OF THE INVENTION

The present invention relates to coatable, water-based compositions for enhancing the durability and ink-receptiveness of imprintable substrates, and coated substrates and constructions made with such compositions.

BACKGROUND OF THE INVENTION

Consumer products labeled with price, product, and other information are ubiquitous in modern society. Imprintable labels are also used on the sides of trucks, on billboards and other signage, and in the home and office. New software and printer designs have enabled a tremendous variety of fonts, designs, and even photographs to be printed with computer printers, and demand has grown for high quality films, papers, and labels that can be used with such printers.

Although efforts have been made to produce high quality ink-receptive sheets, labels, and other products, a continuing need exists for high quality, ink-receptive media characterized by high resolution, high color density, good color gradation, and other print qualities, as well as a need for durable materials that facilitate fast drying of water-based inks, smudgeproofness, waterfastness, and compatibility with both pigment-based and dye-based inks.

SUMMARY OF THE INVENTION

In accordance with the present invention, there are provided improved binder polymers, coatable compositions, and ink-receptive coated products made with the binders and compositions. In one embodiment, a binder polymer for making an ink-receptive composition comprises a copolymer made from a plurality of monomers, including at least one wet abrasion resistance-enhancing monomer, preferably a ureido-functional monomer. In another embodiment, an ink-receptive, coatable composition comprises at least one binder, at least one pigment or other particulate filler, and at least one mordant. The mordant fixes colorants in water-based inks, and diminishes colorant diffusion.

In another embodiment of the invention, the ink-receptive compositions are coated on paper or film, face stock or label stock, and yield coated products suitable for use in ink jet printers. The products exhibit good ink-receptivity towards both pigment-based and dye-based inks, colored as well as black, and are particularly suited for use outdoors and in other conditions where they may be exposed to rain, humidity, or other moisture. The coatings tend to be hydrophilic, yet water resistant, and quickly absorb water-based inks, without becoming tacky or suffering a loss of integrity.

In another embodiment of the invention, a water resistant, wide format or narrow format graphic construction comprises a substrate having first and second surfaces, an ink-receptive coating on the first surface of the substrate, an inked image printed on the coated substrate, and an adhesive coated on or applied to the second surface of the imprinted substrate. Ink jet-imprinted graphic constructions are readily made using wide format or narrow format ink jet printers. Once made, the constructions can be adhered to any object having a surface capable of receiving the constructions, such as billboards, other outdoor signage, the walls of buildings, buses, etc., as well as bottles, cans, and other containers and commercial goods. Constructions made according to the invention are highly durable.

BRIEF DESCRIPTION OF THE DRAWING

The Figure is a schematic side view of a label sheet according to one embodiment of the invention.

DETAILED DESCRIPTION

The present invention provides binders, coatable, ink-receptive compositions, and ink jet-imprintable coated products, such as papers, films, labels and similar constructions. In one embodiment, an ink-receptive composition comprises one or more of each of a binder, a pigment or other particulate filler, and a mordant.

A preferred binder comprises at least one acrylic copolymer formed from a plurality of monomer that includes at least one wet abrasion resistance-enhancing monomer. As used herein, the term "wet abrasion resistance-enhancing monomer" means a copolymerizable monomer which, when present in sufficient quantity, enhances the wet abrasion resistance of an otherwise identical coating made therewith, as compared to the wet abrasion resistance of an otherwise identical coating that lacks the wet abrasion resistance enhancing monomer. Particularly preferred wet abrasion resistance-enhancing monomers are ureido-functional monomers, i.e., copolymerizable monomers having at least one ureido functionality, such as the Sipomer® WAM Sipomer® WAM (3-allyloxy-2-hydroxypropylaminoethylethyleneneurea) and Sipomer® WAM II (N-(methacrylamidoethyl)ethyleneurea).

Other monomers from which the binder copolymer(s) can be formed include, without limitation, copolymerizable acrylic (including methacrylic) monomers, acrylamido (including methacrylamido) monomers, styrenic monomers, allylic monomers, vinyl monomers, maleic and fumaric monomers, acid monomers, and hydroxy-lower organic acrylate or methacylate monomers. In some embodiments it is also preferred to include a small amount of a multifunctional monomer. Other examples of binder polymers include ethylene-vinyl acetate (EVA) copolymers and styrene-butadiene (SB) copolymers.

Nonlimiting examples of acrylic monomers include "soft" monomers, homopolymers of which have a glass transition temperature $(T_g) \leq -20°$ C., e.g., acrylic alkyl acrylates having an alkyl group with four or more carbon atoms, such as butyl, pentyl, hexyl, ethylhexyl, and iso-octyl acrylate; and "hard" acrylic monomers, homopolymers of which have a $T_g > -20°$ C., e.g., short-chain alkyl (meth)acrylates, such as methyl (meth)acrylate, ethyl (meth)acrylate, and propyl acrylate.

Nonlimiting examples of acrylamido monomers include acrylamide and methacrylamide.

Nonlimiting examples of styrenic monomers include styrene, α-methyl styrene, and divinyl benzene.

Nonlimiting examples of vinylic monomers include vinyl acetate and vinyl propionate.

Nonlimiting examples of allylic monomers include allyl acetate, allyl methacrylate, and allyl chloride.

Nonlimiting examples of maleic and fumaric monomers include dioctyl maleate and dioctyl fumarate.

Nonlimiting examples of acid monomers include acrylic acid, methacrylic acid, itaconic acid, and α-carboxyethyl acrylate.

As used herein, the term "hydroxy-lower organic acrylate or methacrylate" refers to an acrylic or methacrylic acid ester, the ester group of which is a straight—or branched-chain alkyl, alkenyl, alkynyl or ether group containing from 1 to about 6 carbon atoms, substituted with at least one hydroxy group at a primary or secondary carbon. Nonlimiting examples of such groups include hydroxy-substituted methyl, ethyl, propyl, vinyl, allyl and propenyl groups.

Nonlimiting examples of hydroxy-lower organic acrylate or methacrylate monomers include hydroxymethyl acrylate, hydroxymethyl methacrylate, hydroxypropyl acrylate, and hydroxypropyl methacrylate.

As used herein, the term "multifunctional monomer" means a monomer having at least two carbon—carbon double bonds and which is copolymerizable with acrylic monomers. Examples include multifunctional acrylates and methacrylates, i.e., diacrylates, triacrylates, dimethacrylates, and trimethacrylates; multifunctional allylic compounds, such as diallyl maleate and allyl methacrylate; and multifunctional monomers having a vinyl functionality. A nonlimiting list includes the following:

| Multifunctional Monomer | Abbreviation |
| --- | --- |
| Allyl methacrylate | AMA |
| Diallyl maleate | DAM |
| Divinyl benzene | DVB |
| Ethylene glycol dimethacrylate | EGDMA |
| N,N'-methylene-bis-acrylamide | NNMBA |
| Tripropylene glycol diacrylate | TPGDA |
| Triallyl cyanurate | TAC |
| Tetraethylene glycol diacrylate | TEGDA |
| Triethylene glycol dimethacrylate | TEDMA, TEGMA |
| Trimethylolpropane triacrylate | TMPTA |
| Trimethylolpropane trimethacrylate | TMPTMA, TRIM |
| Trimethylolpropane diallyl ether | TMPDAE |

Preferred acrylic binder copolymers are predominantly formed of one or more "soft" acrylic monomers, or a mixture of "hard" and "soft" acrylic monomers, with minor amounts of other monomers and one or more wet abrasion resistance-enhancing monomer. The monomers and their relative amounts are selected such that the resulting copolymer is neither extremely hydrophobic nor extremely hydrophobic, and has a glass transition temperature ($T_g$) within the preferred range of from about −10 to +10° C. If the polymer $T_g$ is too low, the scratch resistance of an ink-receptive coating made with the polymer may be too low. If the polymer $T_g$ is too high, the ink-receptive coating may be too powdery. Adjusting the binder/pigment ratio can help compensate for polymer $T_g$ effects.

An acrylic copolymer according to the present invention can be formed by copolymerizing a plurality of monomers, preferably in the presence at a small amount of reactive (copolymerizable) surfactant (for example, sodium vinyl sulfonate). The reactive surfactant copolymerizes with the monomers, but is not considered a monomer and is not included in the calculation of monomer weight percentages.

The plurality of monomers can comprise, for example, about 5 to 90% soft acrylic monomer(s), about 90 to 5% hard acrylic monomer(s), about 1 to 5% hydroxy-lower organic (meth)acrylate(s), about 0.1 to 0.5% multifunctional monomer(s), about 0.1 to 2% acid monomer(s), and about 0.1 to 2% wet abrasion resistance-enhancing monomer(s), with weight percentages being expressed on a percent-by-weight basis, based on the total weight of all monomers. Actual monomer weight percentages, of course, sum to 100%. Most preferred are binder polymers formed by copolymerizing about 20–60% butyl acrylate, about 30–70% methyl methacrylate, about 1–5% hydroxypropyl acrylate, about 0.1–0.5% triethylene glycol diacrylate, about 0.1–2% methacrylic acid, and about 0.1–2% Sipomer® WAM, in the presence of SVS or another reactive surfactant.

In an alternate embodiment, up to about 50% by weight of one or more styrenic monomers are included in the formula, with the weight percentages of the "soft" acrylic monomers, or mixture of "soft" and "hard" acrylic monomers, being correspondingly reduced such that the total weight of all monomers sums to 100%. Including styrene in the formulation increases the hydrophobicity of the copolymer and ink-receptive topcoats formed therewith. This can be particularly advantageous for "wide format" coated constructions, described below. If too much styrene is employed, however, the copolymer will be too hydrophobic, making it less effective as an ink-receptive medium. In addition, too much styrene can reduce the copolymer's cohesive strength and "binding power"—the ability to bind a particulate filler.

Acrylic (including acrylic-co-styrenic) copolymers are prepared using standard polymerization techniques, for example, free radical polymerization. A mixture of monomers is heated in the presence of a free radical initiator, optionally by varying the rate of addition of monomers and/or initiator to the reaction mixture. Emulsion polymerization is preferred.

Nonlimiting examples of suitable polymerization initiators include water- and/or alcohol-soluble initiators, for example persulfates, such as sodium persulfate and potassium persulfate; peroxides, such as hydrogen peroxide and tert-butyl hydroperoxide; and azo compounds, such as VAZO™ initiators; used alone or in combination with one or more reducing agents or activators.

To control polymer chain length, a chain transfer agent or other molecular weight regulator can be added to the polymerization mixture. Nonlimiting examples include 2-mercapto ethanol, n-dodecyl mercaptan (n-DDM), t-dodecyl mercaptan (t-DDM), monothioglycerol, mercapto acetates, and long chain alcohols. Water soluble chain transfer agents, such as 2-mercapto ethanol, are preferred. In some embodiments, a small amount of polyethylene glycol (e.g., PEG 1000) or similar nonionic, water soluble polymer can be added to the reaction mixture as a dispersion medium and/or to increase the solids content of the resulting polymer.

When a multifunctional monomer is present, the binder polymer is crosslinked in-situ, internally within the colloidal polymer particles. As a result, the molecular weight of the polymer is not believed to be an important characteristic.

Other binders useful in the present invention include ethylene-vinyl acetate (EVA) emulsion copolymers and cationic-modified cellulosic materials, preferably used in combination with a ureido-functional acrylic copolymer as described above.

Nonlimiting examples of EVA emulsion copolymers include Airflex™ copolymers sold by Air Products & Chemicals, Inc., Allentown, Pa. They are characterized by high solids content, which is advantageous when the substrate to be coated is paper. Specific examples include Airflex™ 465 (65% solids), Airflex™ 7200 (72–74% solids), and Airflex™ 426 (a high solids EVA copolymer partially functionalized with carboxyl groups).

Nonlimiting examples of cationic-modified cellulosic binders include Celquat L-100 and L-200, both of which are cationic-modified hydroxymethyl cellulose, available from National Starch and Chemical Company, Bridgewater, N.J. They differ in their molecular weight and viscosity.

When preparing ink-receptive compositions, it is preferred to prepare the binder polymer(s) as a water-based latex, i.e., an aqueous emulsion of polymer particles. To this end, one or more nonionic and/or cationic surfactants are employed. Nonlimiting examples of nonionic surfactants include ethoxylated alkylphenols, such as the Triton X family of surfactants made by Union Carbide Corp. (recently acquired by Dow Chemical) Triton X-45 and Triton X-405 are preferred. A nonlimiting example of a useful cationic surfactant is hexadecyltrimethyl-ammonium chloride (HDTMAC), available from Akzo Nobel Chemicals Inc., Chicago, Ill. Anionic surfactants should be avoided because of their likely electrostatic interaction with the mordant(s). Preferably, up to about 10% by weight (on a dry weight basis) of one or more surfactants is employed in the ink-receptive composition. Too much surfactant can potentially cause the coating to have air bubbles, which could adversely effect print quality when coated on film substrates.

A second major component of an ink-receptive composition according to the present invention is one or more particulate fillers, which increase the opacity and/or modify the porosity of the coated substrate. Inorganic pigments are especially preferred; nonlimiting examples include silica (preferably, amorphous silica gels and/or colloidal silica), silicic acid, clays, zeolites, alumina, $TiO_2$, $M_gCO_3$ and the like. The filler increases the ink-absorptivity and improves the print quality and water resistance of the dried coating, and enables the coating to be used with water-based inks containing a dye colorant, as well as pigmented, water-based inks.

Preferred ink-receptive compositions prepared in accordance with the present invention contain from about 30 to 70% by weight particulate filler, based on the dry weight of binder, filler, and mordant. Transulcent coatings can have particulate filler concentrations as low as about 5% by weight. However, at low filler loadings, print quality may suffer. This can be controlled, in part, by adjusting average particle size of the pigment and/or the binder-to-pigment ratio. Without pigment in the composition, drying rates of some inks printed on the coated substrate tend to be undesirably low. However, in those applications where drying time is less of a concern, the pigment can be omitted.

In addition to the pigment(s) included to increase the opacity and/or modify the porosity of the coated substrate, in one embodiment of the invention an additional pigment is added to increase the adhesion of the coating to the substrate and, preferably, to balance the overall properties of the coating, including, for example, improvement of the cohesive strength of the coating. A preferred but nonlimiting example of such a pigment is a colloidal dispersion silica, such as Ludox CL-P™, available from DuPont de Nemours, E. I., Co. (Wilmington, Del.).

A third major component of an ink-receptive composition according to the present invention is a mordant or mixture of mordants. As used herein, the term "mordant" means a material that facilitates the fixing of an ink to an imprintable surface. Some mordants act directly on the fibers of a cloth of paper substrate, making the fibers more susceptible to the dye(s) or pigment(s) in the ink. Other mordants form a complex with the dye, and the complex can then bind to the imprintable surface.

Particularly preferred mordants are cationic polymers, such as poly(diallyldimethylammonium chloride) (known by the abbreviations p-DADMAC and p-DMDAAC). It is available from Ciba-Giegy, Old Bridge, N.J., under the trademark Agefloc Wt 40SLV. It will be appreciated that other halides, dimethylsulfate (DMS), and other counterions can be substituted for chloride ion. Another preferred mordant is a copolymer of one or more hydroxyalkyl methacrylates and a quaternary ammonium salt, such as the quaternary salt of dimethylaminoethyl acrylate (DMAEA). A nonlimiting example of such a mordant is a terpolymer of hydroxyethyl acrylate (HEA), hydroxyethyl methacrylate (HEMA), and quaternary DMAEA-DMS. One such copolymer has, on average, 18–37 HEA, 52–74 HEMA, and 5–17 DMAEA monomer units. Its synthesis is described below. In general, low molecular weight mordants ($M_w$:about 1,500 to 10,000) are preferred, as they tend to have lower viscosities and allow high solids content ink-receptive compositions to be formed.

Coatable, ink-receptive compositions are readily prepared by blending binder(s), filler(s), and mordant(s), using apparatus and blending techniques well known in the art. Other ingredients can be added as desired to improve processing, stability, and other properties. Nonlimiting examples includes defoamers, antioxidants, biocides, UV-absorbers, crosslinkers, rheology control agents (thickeners), e.g., starches, polyvinyl alcohol, polyvinyl pyrrolidone, and cellulosic polymers (for example, Celquat L-100 and L-200, a cationic modified hydroxyethyl cellulose, from National Starch and Chemical Co.) Adding a water soluble polymer such as PVOH, PVP, cellulose derivative, etc., can improve the binding power of the composition. To this end, using low molecular weight polymers helps avoid an excessive drop in solids content, (which can adversely affect coatability.) On the other hand, where the finished coating requires high waterfastness, higher molecular weight polymers may be employed.

In some embodiments, additional surfactant is added before the filler(s) are introduced to the formulation, making it easier to disperse or stabilize the particulate filler(s) in water. Nonlimiting examples of useful surfactants include nonionic surfactants like Tamol® dispersants, from Rohm & Haas Co.

To improve the composition's durability, the binder can be modified by adding a crosslinker. Suitable crosslinkers include, without limitation, multifunctional polyisocyanates, melamine formaldehyde resins, and urea formaldehyde resins. Although not bound by theory, it is believed that such crosslinkers promote the formation of network structures during or after drying of the compositions on a face stock or label stock.

In another aspect of the invention, ink-receptive coated constructions or products, such as papers, cardboard, corrugated boards, films, fabrics, labels, and other porous or nonporous substrates, are prepared by applying an ink-receptive composition to a substrate, such as by coating or other processes known to those skilled in the art. The composition is then dried, preferably at an elevated temperature in an oven. For paper substrates, it is preferred to employ high solids content compositions, in order to minimize curling of the paper during coating and to facilitate drying. When cut to size, the coated products are particularly suited for use in ink jet printers, black and white, as well as colored.

Both "wide format" and "narrow format" ink-receptive products are encompassed by this aspect of the invention. Wide format products are generally manufactured as wide rolls (24 or more inches wide), and are roll-fed into large printers for imaging. They are typically employed in commercial settings, and include, without limitation, movie theater posters, outdoor signage, large advertisements, and the like. Wide format products are often used in outdoor, where they may be exposed to the elements. Narrow format products are generally manufactured as narrow rolls or individual sheets, and can be roll-fed or sheet-fed into printers for imaging. They are typically used in the office or home, and include, without limitation, computer printer paper, labels, transparencies, and the like.

Wide format and narrow format ink-receptive products differ not only in size, but also in ink capacity, durability, and other properties, and are often exposed to different use environments. For example, wide format products may encounter more ink per unit area when run through certain commercial printers. Problems with poor image quality, color bleed, and smearing can be avoided by enhancing the ink-absorbtivity of the imprintable substrate-for example, by adding more pigment or filler to the coating composition.

Durability, waterfastness, resistance to light-induced fading, abrasion resistance, color stability, and other properties also can differ between wide format and narrow format products. In gewneral, wide format products must exhibit greater durability and waterfastness than narrow format products. The present invention is intended to meet the more rigorous demands placed on wide format products, including products intended for outdoor use, as well as the demands placed on narrow format products.

Coatable substrates useful in the practice of the present invention include paper, cardboard, corrugated board, plastic film, and metal film or foil face stocks and label stocks traditionally used for ink printing applications, particularly ink jet printing. Self-wound materials and other linerless products are also suitable substrates. Nonlimiting examples include self-wound tapes. Nonlimiting examples of paper face stocks suitable for use with the present invention include offset, bond, text, cover, index, lightweight printing paper, litho paper, and sulfite paper. Although not required, a surface treatment, such as starch, sizing agents, and the like, can be included on the paper substrates. Nonlimiting examples of plastic face stocks suitable for use with the present invention include polystyrene, polyvinyl chloride, polyester, nylon and polyolefin (for example, polyethylene) films. Preferred vinyl fimls include 700 HP (a polymerized, plasticized, calendered PVC film) and MX3400, an 85 micron polymeric film. Polymer blends are another example of plastic facestocks. The films may be cast, extruded, or coextruded. A film substrate comprising a coextruded polyolefin-polybutylene terephthalate sandwich can be used in the present invention. A nonlimiting example of a metal face stock suitable for use with the present invention is aluminum foil.

Coatable label stocks useful in the practice of the present invention include without limitation, a variety of printable label constructions or assemblies well known in the art, each typically comprising a label face stock (sheet or roll) having at least one inner and at least one outer surface, a pressure-sensitive adhesive (PSA) adhered to at least one inner surface of the label face stock, and a removable release liner abutting the PSA, the entire assembly forming a sandwich-like construction.

An ink-receptive coated product is easily made by applying an ink-receptive composition as described above to one or both surfaces of a face stock or label stock, using a conventional coating or other application technique, and then drying the coating at room or elevated temperature. Nonlimiting examples of coating techniques include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. The composition can also be applied to paper substrates in a size press, during paper manufacture. For label products, the composition can be applied using any conventional technique or process, including without limitation, coating "on-press" during the converting process (e.g., in concert with the processes of die-cutting, matrix stripping, etc.), coating off-press using a separate coater, and other application methods.

In some embodiments, it is advantageous to add a crosslinker to the composition, immediately prior to coating. Crosslinking then occurs as the coating is dried, either at room or elevated temperature.

In general, dry coat weights of from about 5 to 80 g/m$^2$ are preferred, depending on the particular face or label stock employed. With porous substrates (e.g., paper) one can use relatively low coat weights—about 5 to 30 g/m$^2$, more preferably, about 15 to 25 g/m$^2$ (dry weight). With nonporous substrates (e.g., polyvinyl chloride (PVC)), ink drying time becomes a greater concern, and it is preferred to employ higher coat weights—about 40 to 80 g/m$^2$ (dry weight).

Using the ink-receptive compositions and coated products described herein, high quality imprinted constructions (sheets, labels, and other products) are prepared by running the constructions through a printer and printing an image thereon. Advantageously, the compositions and coated products are designed to perform well with a variety of printer technologies including, without limitation, piezoelectric printer heads, thermal imaging, drop on demand, and other technologies. A particularly preferred aspect of the invention is the finished product—a printed (inked) construction comprising a face or label stock having at least one inner surface and at least one outer surface, printed with a high quality black and/or colored image. As but one example, this aspect of the invention is embodied by an ink jet-imprinted construction comprising a porous or nonporous substrate (face stock or label stock), coated with an ink-receptive composition and imprinted with an ink image. In some embodiments, the construction is die-cut.

Reference is now made to the Figure, which is a schematic illustration of a sheet of ink-receptive labels prepared in accordance with one embodiment of the invention. The sheet 10 has a sandwich structure, in which a facestock 12, a pressure-sensitive adhesive (PSA) layer 18, a release liner 24, and an ink-receptive topcoat 30 are coated on or laminated to each other in the order shown. Thus, the facestock 12 has first and second surfaces 14 and 16; the PSA layer 18 has first and second surfaces 20 and 22; the release liner 24 has first and second surfaces 26 and 28, and the ink-receptive top coat has first and second surfaces 32 and 34. It will be appreciated that the relative thickness (ES) of the layers is variable and is not drawn to scale in the figure.

A plurality of die cuts 36 extend through the ink-receptive top coat, the facestock, and the pressure-sensitive adhesive, but not the release liner. The die cuts facilitate detachment and removal of individual labels from the label sheet.

Such a construction is prepared in a conventional manner. A PSA is coated on a siliconized release liner; an ink-receptive coating is applied to one side of a facestock; and the two subassemblies are laminated to each other. Alternatively, a PSA is coated on one side of a facestock and laminated to a protective release liner. An ink-receptive coating is then applied to the other side of the facestock. The layers of the construction can also be applied in other ways and in alternative sequences known to those skilled in the art. The sheet is then die-cut.

It will be appreciated that the construction shown in the figure is but a single embodiment of an ink-receptive construction prepared in accordance with the invention. There are numerous other embodiments and variations that will be appreciated by one skilled in the art upon reading the present description. Ink-receptive papers, films, and other products can be made by coating or otherwise applying an ink-receptive composition to a substrate. For example, the compositions described herein can be used to prepare fabric care labels (labels bearing care and cleaning instructions for a piece of clothing). Such labels must survive the rigors of repeated washing and drying.

EXAMPLES

The following are nonlimiting examples of binders, mordants, ink-receptive compositions, and coated substrates prepared according to the invention. The following abbreviations and product names are used throughout.

| Monomers | |
|---|---|
| AA | Acrylic Acid |
| BA | Butyl Acrylate |
| HEA | Hydroxyethyl Acrylate |
| HEMA | Hydroxyethyl Methacrylate |
| HPA | Hydroxypropyl Acrylate |
| DMAEA-DMS | Dimethylaminoethyl acrylate - dimethyl sulfate (quarternary) |
| MAA | Methacrylic Acid |
| MMA | Methyl Methacrylate |
| TEGDA | Tetraethylene Glycol Diacrylate |
| Sipomer ® WAM | 3-Allyloxy-2-hydroxypropylaminoethylethylene urea |

| Surfactants | |
|---|---|
| SVS | Sodium Vinyl Sulfonate |
| HDTMAC | Hexadecyltrimethylammonimum chloride |
| PEG-1000 | Polyethylene Glycol 1000 |
| Triton X-45 | Nonionic Surfactant (Union Carbide Corp.) |
| Triton X-405 | Nonionic Surfactant (Union Carbide Corp.) |
| Ethoquad C/12 | Cocomethyl [ethoxylated (2)] ammonium chloride (Akzo Nobel) |

| Crosslinkers | |
|---|---|
| CX-100 | Polyaziridine |
| Cymel | Melamine Formaldehyde (Cytec) |

| Binders | |
|---|---|
| Airflex 7200 | Ethylene Vinyl Acetate Copolymer Emulsion |
| Celquat L-200 | Cationic-modified Hydroxyethylcellulose |

| Mordants | |
|---|---|
| Agefloc Wt40SLV | Poly(diallylmethylammonium chloride) |
| Calgon CP-190 | A derivative of polydiallydimethyl(ammonium chloride) |

| Pigments and Fillers | |
|---|---|
| Buckman 784 | Colloidal Silica |
| Gasil HP-39 | Silica gel |
| Crosfield IJ35 | Amorphous silica |

| Other | |
|---|---|
| Drewplus L-191 | Defoamer |
| SFS | Sodium Formaldehyde Sulfoxylate |
| Tinuvin 1130 | UV absorber (Ciba-Geigy) |
| Tinuvin 292 | UV absorber (Ciba-Geigy) |

Binder Polymer A

A binder comprising an acrylic copolymer formed of the monomers BA/MMA/HPA/TEGDA/MAA/SIPOMER® WAM was prepared by emulsion polymerization, using the components listed in Table 1. A 4-neck, 1,000 ml flask equipped with a thermometer, stirrer, and condenser was charged with components IC-1, and purged with nitrogen for 30 minutes. The components IC-2 were charged to the reactor with proper agitation, and the reactor contents were heated to 50° C. Components SA-1 and SA-2 were then added at a 5 hour rate. Five minutes have initiation, a pre-emulsion of the components of SA-3 (prepared by slowly adding monomers to the aqueous portion under high-speed agitation) was charged to the reactor, over a 4 hour period. Reaction was allowed to run at 55–56° C. Charges SA-1 and SA-2 were continued 30 minutes after the end of SA-3 to convert any residual monomers. The resulting acrylic latex had a solids content of 50.3% and a pH of 6.2.

Binder Polymers B–F

Five other acrylic copolymer binders were prepared according to the method of Binder Polymer A, using the components and quantities listed in Table 1.

TABLE 1

Binder Polymers A–F

Parts-by-Weight

| Component | Polymer A | Polymer B | Polymer C | Polymer D | Polymer E | Polymer F |
|---|---|---|---|---|---|---|
| IC-1 | | | | | | |
| Deionized water | 232 | 232 | 383 | 343 | 383 | 383 |
| Triton X-45 | 3 | 3 | 4.43 | 4.43 | 4.43 | 4.5 |
| Triton X-405 | 1.5 | 1.5 | 2.25 | 2.25 | 2.25 | 2.25 |
| $Fe_2SO_4 \cdot 7H_2O$ (0.1%) | 0.3 | 0.3 | 0.44 | 0.44 | 0.44 | 0.45 |
| DMAEA-DMS | 0 | 0 | 0.44 | 0.44 | 0.44 | 0.45 |
| SFS | 0.1 | 0.1 | 0.15 | 0.15 | 0.15 | 0.15 |
| MAA | 0.3 | 0 | 0 | 0 | 0 | 0 |
| Acetic acid to pH 4.0 | yes | yes | yes | yes | yes | yes |
| IC-2 | | | | | | |
| BA | 6 | 6 | 8.9 | 8.9 | 8.9 | 9.0 |
| MMA | 9 | 9 | 13.25 | 13.25 | 13.25 | 13.5 |
| SA-1 | | | | | | |
| Deionized water | 18 | 18 | 26.6 | 26.6 | 26.6 | 27 |
| SFS | 0.9 | 0.9 | 1.4 | 1.4 | 1.4 | 1.4 |
| SA-2 | | | | | | |
| Deionized water | 18 | 18 | 26.6 | 26.6 | 26.6 | 27 |
| t-BHP | 0.9 | 0.9 | 1.4 | 1.4 | 1.4 | 1.4 |
| SA-3 | | | | | | |
| Deionized water | 60 | 60 | 88.6 | 88.6 | 88.6 | 90 |
| Triton X-405 | 24 | 24 | 35.5 | 35.5 | 35.5 | 36 |
| DMAEA-DMS | 0 | 0 | 8.9 | 8.9 | 8.9 | 9 |
| Triton X-45 | 1.8 | 1.8 | 2.6 | 2.6 | 2.6 | 2.7 |
| BA | 129 | 129 | 212.72 | 190.6 | 235 | 213 |
| MMA | 156 | 156 | 208.37 | 230.5 | 187 | 208 |
| HPA | 6 | 6 | 8.9 | 8.9 | 8.9 | 9 |
| TEGDA | 0.6 | 0.6 | 0.89 | 0.89 | 0.89 | 0.9 |
| MAA | 6 | 0 | 0 | 0 | 0 | 0 |
| Sipomer WAM I | 6.25 | 6.8 | 5 | 5 | 5 | 5 |

Mordant A

A mordant comprising a copolymer of HEA, HEMA, and quaternary DMAEA-DMS was prepared by emulsion polymerization, using the components listed in Table 2 and substantially the same procedure as described for "Polyquat A" and "Polyquat B" in U.S. Pat. No. 6,153,288 (the '288 patent), at col. 7, line 46-col. 8, l. 8. The entire contents of the '288 patent is incorporated by reference herein.

TABLE 2

Mordant A

| Component | Parts-by-weight |
|---|---|
| Deionized Water | 48.08 |
| PEG-1000 | 12.67 |
| HEA | 8.44 |
| HEMA | 21.09 |
| DMAEA-DMS | 8.44 |
| $H_2O_2$ | 0.22 |
| SFS | 0.11 |
| Sodium Persulfate | 0.62 |
| NaOH | 0.33 |
| Total | 100 |

Mordant B

A mordant comprising a copolymer of HEA, HEMA, AA, and quaternary DMAEA-DMS was prepared by emulsion polymerization, using the same components and procedure described above for Mordant A. The only difference was the incorporation of 1.9 weight % of AA.

Ink-Receptive Compositions

Examples 1–20

Using the binders, fillers, mordants, and other components listed in Tables 3 and 4, twenty different ink-receptive compositions were prepared by blending the components in a low-medium shear mixer, essentially in the order listed. Examples 1 and 2 differ in their concentration of Agefloc Wt40SLV, which can affect color-to-color bleed of coated substrates made with the composition. Examples 3 and 4 differ in several ways, including the choice of binder and mordant, the presence or absence of a crosslinker, and the concentration of Agefloc WtSLV. The binder used in Example 4 (Polymer B) has a lower glass transition temperature than that used in Example 3 (Polymer C), with the intention of reducing initial cracking of the topcoat surface. Example 5 has a higher binder/pigment ratio than Examples 1–4. This also reflects an effort to reduce initial cracking of the topcoat surface.

TABLE 3

Ink-Receptive Compositions 1–10

Parts-By-Weight

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Water | 26 | 26 | 26 | 25 | 26 | 26 | 26 | 26 | 26 | 26 |
| Surfactants | | | | | | | | | | |
| Triton X-405 | 2 | 2 | 2 | 2 | 2 | 2 | 2 | 2 | 2 | 2 |
| Arquad 16-29W | 2 | 2 | 2 | 2 | 2 | 2 | | 2 | 2 | 2 |
| Ethoquad C/12 | | | | | | | 1.69 | | | |
| Mordants | | | | | | | | | | |
| Agefloc Wt40SLV | 10 | 12 | 10 | 12 | 10 | 10 | 10 | 10 | 10 | 10 |
| Mordant A | 9.9 | 9.9 | | | 9.9 | 9.9 | | 9.9 | 9.9 | 9.9 |
| Mordant B | | | 9.9 | 9.9 | | | 9.9 | | | |
| Fillers | | | | | | | | | | |
| Buckman 784 | 14.1 | 14.1 | 14.1 | 14.1 | 14.1 | 14.1 | 14.1 | 14.1 | 14.1 | 14.1 |
| Gasil HP-39 | 13.9 | 13.9 | 13.9 | 13.9 | 13.9 | 13.9 | 13.9 | 13.9 | 13.9 | 13.9 |
| Binder Polymers | | | | | | | | | | |
| B | | | | | | | | | | |
| C | | | | 26.7 | | | | | | |
| D | 25.6 | 25.6 | 25.6 | | 27.6 | 25.6 | 25.6 | 25.6 | | |
| E | | | | | | | | | 25.6 | |
| F | | | | | | | | | | 25.6 |
| Defoamer | 0.24 | 0.24 | 0.24 | 0.24 | 0.24 | 0.17 | 0.17 | 0.17 | 0.17 | 0.17 |
| Crosslinker (4%) | | | 0.34 | 0.34 | | | 0.34 | | | |
| UV absorber | | | | | | | | | | |
| Tinuvin 1130 | | | | | | | | 0.4 | | |
| Tinuvin 292 | | | | | | | | 0.2 | | |

TABLE 4

Ink-Receptive Compositions 11–20

Parts-By-Weight

| COMPONENT | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Deionized Water | 26 | 26 | 26 | 26 | 26 | 25.2 | 26.7 | 26 | 26 | 26 |
| Surfactants | | | | | | | | | | |
| Triton X-405 | 2 | 2 | 2 | 2 | 2 | 1.71 | 1.71 | 2 | 2 | 2 |
| Arquad 16-29W | 2 | 2 | 2 | 2 | 2 | 3.42 | 3.42 | 2 | 2 | 2 |
| Ethoquad C/12 | | | | | | | | | | |
| Mordants | | | | | | | | | | |
| Calgon CP-190 | | | | | | 12.1 | | | 6 | |
| Agefloc Wt40SLV | 10 | 12 | 10 | 12 | 10 | | 10.6 | 10 | 5.5 | 10 |
| Mordant A | 9.9 | 9.9 | | | 9.9 | | | 9.9 | | 12 |
| Mordant B | | | 9.9 | 9.9 | | 14.09 | 14.09 | | 9.9 | |
| Fillers | | | | | | | | | | |
| Buckman 784 | 14.1 | 14.1 | 14.1 | 14.1 | 14.1 | 5.98 | 5.98 | 14.1 | 14.1 | 14.1 |
| Gasil HP-39 | 13.9 | 13.9 | 13.9 | 13.9 | 13.9 | 12.5 | 12.5 | 13.9 | 13.9 | 13.9 |
| Crosfield IJ35 | | | | | | 2.64 | 2.64 | | | |
| Binder Polymers | | | | | | | | | | |
| B | 25.6 | 25.6 | 25.6 | | 27.6 | | | | | |
| C | | | | 25.6 | | | | | | |
| D | | | | | | 21.9 | 21.9 | 25.6 | 25.6 | 25.6 |
| Defoamer | 0.24 | 0.24 | 0.24 | 0.24 | 0.24 | 0.17 | 0.17 | 0.24 | 0.24 | 0.24 |
| Crosslinker (4%) | | | 0.34 | 0.34 | | 0.34 | 0.34 | | 0.34 | |
| UV absorber | | | | | | | | | | |

Example 21
(Fabric Care Label)

An ink-receptive composition particularly designed for fabric substrates was prepared by blending pigments, surfactants, mordants, binders, and other components in the order listed in Table 5 in a high shear mixer. The Celquat binder was added slowly over a five minute period, and the composition was stirred for one hour. The acrylic binder (Polymer F) was then added, and the composition was stirred until uniform and consistent. Crosslinker was added just before the composition was coated on a substrate.

TABLE 5

Example 21 (Fabric Care Label)

| COMPONENT | Parts-by-Weight |
|---|---|
| Water | 32.7 |
| Pigment | |
| TiO$_2$ | 3.04 |
| Defoamer | |
| Drewplus L-191 | 0.24 |
| Surfactant | |
| Triton X-405 | 2 |
| Ethoquad C/12 | 1.69 |
| Mordant | |
| Agefloc Wt40SLV | 10 |
| Mordant A | 9.9 |
| Filler | |
| Gasil HP-39 | 13.9 |
| Binder | |
| Celquat L-200 | 1 |
| Polymer F (Production Scale) | 27.6 |
| Crosslinker | |
| Cymel 385 | 1.37 |

Coated Media

Ink-receptivity, printed image quality, wet abrasion resistance, and other properties of several topcoated substrates were determined for several examples and controls. In each case, the coated substrate was a PVC label stock, coated on one side with a solvent acrylic PSA (protected with a siliconized paper release liner), and coated on its opposite side with an ink-receptive topcoat. Control 1 is a pigmented, EVA copolymer containing no ureido functionality, made by Avery Dennison. Control 2 is 3M 8522, made by Minnesota Mining and Manufacturing.

Print analyses and weathering tests were conducted by printing an image on each construction using Encad GO inks in a NovaJet Pro printer and HP-UV inks in a HP 2500 printer. The following properties were evaluated:

"Bleeding" (also referred to as "color-to-color bleed") represents a common ink-to-paper interaction causing degradation in print quality by the bleeding of one color—yellow (Y), magenta (M), cyan (C), or black (B) into adjacent color(s). When an image is printed using an ink jet printer, drops of ink are ejected through a printer nozzle onto one or more regions of a substrate. Multiple passes by the printer head are possible, allowing one to create successively brighter colors. In addition, a black image can be formed by combining the three primary colors (Y, M, and C). When each color is printed at 100% saturation, the result is a YMC "300% black" image (which is usually more intense than a single pass of black ink at 100% saturation). Tables 6 and 7 provide a "Bleeding Score" based on a visual assessment of YMC 300% black image bleed, ranked on a scale of 0 to 10, with 0 being the worst (most bleed) and 10 being the best (least bleed).

"Ink Dry Time" is a measure of the rate of ink absorption into a sheet of printed media.

"Color Gamut" is the range of different colors that can be detected using a calorimeter.

The numerical entry is a representation of the breadth of color scope, a complex property.

"Water Drip Score" represents the amount of colorant visually observed to be transferred from a printed area to an unprinted area after deionized water is dispensed at a 45° angle onto the printed media. A score of 0 is the worst (most colorant transferred) and a score of 10 is the best (least colorant transferred).

"Scratch Resistance" is a measure of the hardness and cohesive strength of the topcoat, determined by applying a stylus to the surface and noting the depth of the track formed and observing whether any of the coating is removed. Scratch resistance was measured with an Erichsen Scratch Pen, with the force required to have the tip penetrate the coating and physically damage and scratch it reported in Newtons (N). A higher number denotes better scratch resistance.

"Wet Abrasion Resistance" is a measure of the resistance of the topcoat and inked image to being rubbed away by wet (aqueous) abrasion. A higher score denotes more resistance. Images made with the primary colors (Y, M, and C), secondary colors (red (R) and green (G)), black (B), and 300% black (YMC) were tested.

The test results are summarized in Tables 6–10 and the accompanying text.

TABLE 6

Performance with Encad GO Inks

| Example | Bleeding Score | Ink Dry Time | Color Gamut | Waterdrip Score |
|---|---|---|---|---|
| Control 1 | YMC 8 | <1 minute | 8308 | 8 |
| Control 2 | YMC 10 | <1 minute | 11356 | 2 |
| Ex. 1 | YMC 6 | <1 minute | 7785 | N/A |
| Ex. 2 | YMC 6 | <1 minute | 7938 | N/A |
| Ex. 3 | YMC 6 | <1 minute | 7715 | N/A |
| Ex. 4 | YMC 8 | <1 minute | 8320 | N/A |
| Ex. 5 | YMC 4 | <1 minute | 7634 | N/A |
| Ex. 6 | YMC 6 | <1 minute | 7816 | 6 |
| Ex. 7 | YMC 6 | <1 minute | 7961 | 6 |
| Ex. 8 | YMC 6 | <1 minute | 7526 | 6 |
| Ex. 9 | YMC 8 | <1 minute | 9067 | 8 |
| Ex. 10 | YMC 8 | <1 minute | 8954 | 8 |

TABLE 7

Performance with HP UV Inks

| Example | Bleeding Score | Ink Dry Time | Color Gamut | Waterdrip Score |
|---|---|---|---|---|
| Control 1 | YMC 8 | <1 minute | 9639 | 8 |
| Control 2 | YMC 8 | <1 minute | 15987 | 0 |
| Ex. 1 | YMC 8 | <1 minute | 9532 | N/A |
| Ex. 2 | YMC 6 | <1 minute | 9421 | N/A |
| Ex. 3 | YMC 6 | <1 minute | 9359 | N/A |
| Ex. 4 | YMC 8 | <1 minute | 9630 | N/A |
| Ex. 5 | YMC 4 | <1 minute | 9266 | N/A |
| Ex. 6 | YMC 4 | <1 minute | 9046 | 4 |
| Ex. 7 | YMC 4 | <1 minute | 9521 | 4 |
| Ex. 8 | YMC 4 | <1 minute | 8947 | 6 |
| Ex. 9 | YMC 6 | <1 minute | 9741 | 8 |
| Ex. 10 | YMC 6 | <1 minute | 9427 | 8 |

In general, bleed performance of Examples 1–10 were comparable to or just slightly less than that exhibited by Control 1. In all cases (Examples 1–10 and Controls 1 and 2), ink drying time was less than one minute. The color gamut of Examples 1–10 was comparable to Control 1, while Examples 9 and 10 outperformed Control 1. The water drip test performance of Examples 9 and 10 was comparable to that of Control 1, while the water drip test performance of Control 2 was very bad.

TABLE 8

Scratch Resistance

| Example | N |
|---|---|
| Control 1 | 4–5 |
| Control 2 | 4–5 |
| Ex. 1 | 5–6 |
| Ex. 2 | 5 |
| Ex. 3 | 7 |
| Ex. 4 | 4–5 |
| Ex. 5 | 5 |
| Ex. 6 | 4–5 |
| Ex. 7 | 4–5 |
| Ex. 8 | 4 |
| Ex. 9 | 4–5 |
| Ex. 10 | 5 |

The scratch resistance of all samples (1–10) was comparable or superior to that of Controls 1 and 2, with Example 3 exhibiting superior scratch resistance.

TABLE 9

Wet Abrasion Resistance

| | Rating (HP-UV) | | | | | | | Rating (Encad GO) | | | | | | |
|---|---|---|---|---|---|---|---|---|---|---|---|---|---|---|
| Example | Average | Y | M | C | R | G | B | YMC | Average | Y | M | C | B | R | G | YMC |
| Control 1 | 5.1 | 8 | 8 | 6 | 4 | 4 | 4 | 2 | 5.1 | 8 | 8 | 6 | 4 | 4 | 4 | 2 |
| Control 2 | 0 | 0 | 0 | 6 | 0 | 4 | 0 | 0 | 0 | 0 | 0 | 0 | 0 | 0 | 0 | 0 |
| Ex. 1 | 5.7 | 6 | 6 | 6 | 6 | 6 | 6 | 4 | 6.0 | 6 | 8 | 4 | 6 | 8 | 4 | 6 |
| Ex. 2 | 4.6 | 6 | 6 | 2 | 4 | 6 | 4 | 4 | 5.1 | 6 | 4 | 4 | 6 | 6 | 8 | 2 |
| Ex. 3 | 5.7 | 6 | 8 | 6 | 6 | 6 | 6 | 2 | 6.0 | 6 | 8 | 6 | 6 | 6 | 6 | 4 |
| Ex. 4 | 4.9 | 6 | 6 | 6 | 6 | 6 | 2 | 2 | 6.0 | 8 | 6 | 6 | 4 | 8 | 8 | 2 |
| Ex. 5 | 5.4 | 8 | 6 | 4 | 6 | 6 | 6 | 2 | 6.0 | 8 | 8 | 4 | 6 | 6 | 4 | 6 |
| Ex. 6 | 5.1 | 8 | 8 | 6 | 4 | 4 | 4 | 2 | 6.6 | 8 | 8 | 6 | 6 | 8 | 6 | 4 |
| Ex. 7 | 6.0 | 4 | 8 | 8 | 8 | 6 | 6 | 2 | 5.1 | 4 | 6 | 4 | 6 | 8 | 6 | 2 |
| Ex. 8 | 7.1 | 8 | 10 | 6 | 8 | 6 | 8 | 4 | 6.6 | 8 | 8 | 4 | 8 | 8 | 6 | 4 |
| Ex. 9 | 6.6 | 6 | 8 | 4 | 8 | 4 | 8 | 8 | 4.3 | 4 | 4 | 4 | 6 | 6 | 4 | 2 |
| Ex. 10 | 5.7 | 6 | 4 | 8 | 8 | 6 | 4 | 4 | 5.4 | 6 | 4 | 4 | 6 | 6 | 6 | 6 |

With the exception of Examples 2 and 9, wet-rub resistance (wet abrasion resistance) of Examples 1–10 was superior to that of Control 1. Control 2 (the warranted product for HP-UV inks) showed disastrously bad wet-rub resistance, with the application of water dissolving inks from the substrate immediately upon testing. Overall durability of constructions made in accordance with the invention is quite good.

Accelerated Aging

The examples (slightly modified in terms of water content and the order in which the components were added) and controls were also evaluated for potential weathering, using a weatherometer, an accelerated weather chamber designed to mimic months of exposure to rain and sunlight. Testing proceeds according to SAE j-1960. At periodic intervals, samples were visually inspected for topcoat cracking (so-called "mud-cracking"). The extent of decoloration ("ΔE") was also measured. Acceptable performance requires no visible mud-cracking and a ΔE value less than 10. The time beyond which the criteria are just not met was recorded as the accelerated weather performance. This can be converted into a measure of the weatherability (in months) expected of the sample under real outdoor weathering conditions. The tests revealed that samples according to the present invention passed the desired 300 hour mark (which is considered equivalent to 12 months of actual weathering). In contrast, Control 1 exhibited acceptable performance for no more than about 200 hours.

In view of the preceding description, it will be apparent to a person skilled in the art that a number of variations can be made without departing from the invention, and all such modifications as would obvious to one skilled in the art are intended to be included within the scope of the following claims. For example, in some embodiments, it may be advantageous to apply an overlaminate to the outer surface of the ink-receptive topcoat, to provide abrasion resistance and to prolong durability. Nonlimiting examples include DOL 1000 and DOL 4300. Throughout the text and the claims, use of the word "about" in relation to a range of numbers is intended to modify both the low and the high values stated.

In the claims:

1. A composition comprising:
   an acrylic copolymer formed from a plurality of monomers consisting essentially of about 5 to 90% butyl acrylate, about 90% to 5% methyl methacrylate, about 1 to 5% hydroxypropyl acrylate, about 0.1 to 0.5% tetraethylene glycol diacrylate, about 0.1 to 2% methacrylic acid, and about 0.5 to 2% 3-allyloxy-2-hydroxypropylaminoethylethylene urea;
   a particulate filler; and
   a mordant.

2. A composition as recited in claim 1, wherein the particulate filler is selected from the group consisting of silica gel, collodial silica, titanium dioxide, magnesium carbonate, silicic acid, clays, zeolites, alumina, and mixtures thereof.

3. A composition as recited in claim 1, wherein the mordant comprises at least one cationic polymer.

4. A composition as recited in claim 1, wherein said at least one cationic polymer is poly(diallyldimethylammonium chloride) or poly(diallyldimethylammonium dimethylsulfate).

5. A composition as recited in claim 1, wherein said at least one cationic polymer is a copolymer of one or more hydroxyalkyl (meth)acrylates and a quaternary ammonium salt.

6. A composition as recited in claim 5, wherein said copolymer is a copolymer of hydroxyethyl acrylate, hydroxyethyl methacrylate, and a quaternary salt of dimethylaminoethyl acrylate.

7. A composition as recited in claim 1, wherein the mordant comprises poly(diallyldimethylammonium chloride) and a copolymer of one or more hydroxyalkyl (meth)acrylates and a quaternary ammonium salt.

8. A composition comprising:

an acrylic copolymer formed from a plurality of monomers that comprises, on a percent-by-weight basis, based on the total weight of all monomers, about 20 to 60% butyl acrylate, about 30 to 70% methyl methacrylate, about 1 to 5% hydroxypropyl acrylate, about 0.1 to 0.5% triethylene glycol diacrylate, about 0.1 to 2% methacrylic acid, and about 0.1 to 2% copolymerizable monomer having at least one ureido functionality.

* * * * *